United States Patent Office 3,006,815
Patented Oct. 31, 1961

3,006,815
HEAT STABILIZATION OF ENZYMES AND METHOD
Don Scott, Chicago, Ill., assignor to Fermco Laboratories, Inc., a corporation of Illinois
No Drawing. Filed Aug. 24, 1956, Ser. No. 605,934
12 Claims. (Cl. 195—68)

This invention relates to a method of and means for protecting heat-processed, water-containing foods and beverages which are normally subjected to heating during filling, pasteurizing and packing operations.

The method of the present invention comprises bringing the water-containing foods and beverages into contact with a heat-stabilized glucose oxidase and catalase enzyme preparation in which the enzyme components are first stabilized against destruction by heat and oxygen through complete drying and then protected against heat in the presence of moisture by coating the dry stabilized enzyme preparation with methyl cellulose. The methyl cellulose prevents access of the aqueous food to the enzymes when hot and permits the release of the enzymes in said preparation during the cooling of the heat-processed foods, whereby there is overcome the deleterious action of free oxygen and oxygen in solution with the food products.

It is known that various heat-processed foods and beverages are adversely affected by free oxygen or oxygen in solution with the product. The oxygen brings about changes in the product which result in the appearance of cloudiness in such fruit juices as apple cider, for example, and in canned vegetables such as asparagus, peas, and the like, and which cause impairment of the flavor, thereby detracting from the quality of the initial packing which is made. Particularly in the case of canned soft drinks which may be carbonated or non-carbonated, difficulties have been encountered with impairment of color and flavor where the product must be stored on the shelf for several months up to a year. Not only does the color of such soft drinks tend to fade and the flavor thereof become impaired, but there may be iron pick-up from the material of the can, corrosion, and eventually perforation of the can because of the chemical and corrosive action of oxygen which is present in solution or in the space above the top surface of the beverage.

Heretofore, the suggestion has been made as in Patent 2,482,724, the Reissue thereof, Re. 23,523, and Patent 2,651,592, that an enzyme, preferably glucose oxidase, be added to sealed containers of the food in order to consume the oxygen therein. By combining with glucose oxidase enzyme a catalase enzyme, hydrogen peroxide ordinarily produced, is decomposed into water and oxygen which is capable of further reacting with glucose in the presence of the glucose oxidase enzyme catalyst.

The treatment of food products with enzymatic oxidase specific for the aldose sugar (glucose), in the presence of oxygen, serves to convert glucose to gluconic acid, (1) $2 \text{ glucose} + 2O_2 + 2H_2O = 2 \text{ gluconic acid} + 2H_2O_2$ The catalase enzymatically decomposes the hydrogen peroxide formed in the glucose oxidation step and this free oxygen is utilized in the oxidation of additional glucose, (2) $2H_2O_2 = 2H_2O + O_2$ By combining Equations 1 and 2, it is seen that all of the oxygen present in the system is used in the glucose oxidation step.

The product of reaction by the enzymatic elimination of free oxygen from the canned foodstuff is gluconic acid in amounts determined by the amount of free oxygen present, which product is well recognized as a harmless by-product in the food.

The prior treatment of cans or packages of the food product with glucose oxidase and catalase enzyme mixtures has of necessity been confined to the incorporation of the enzyme preparation while the foodstuff is at or near room temperature. The available enzyme preparations when added to the food product at high temperatures as are encountered during hot filling and vacuum packing operations in the preparation of baby foods in jars, apple juice, canned dog foods, and the like, are rapidly destroyed due to the effect of high temperatures in the presence of the aqueous food medium. This destruction of enzymes is appreciable at temperatures slightly above 45° C. and the destruction is accelerated as the temperature is increased. Temperatures above about 60° C. cause such a rapid destruction of the enzyme, particularly glucose oxidase, as to substantially completely impair the capacity of the enzyme to consume the available oxygen in the foodstuff.

The surprising discovery has been made that glucose oxidase-catalase enzymes may be stabilized to withstand destruction from high temperatures, temperatures in excess of 40° C. and even in excess of 100° C., as are employed during hot filling operations, pasteurizing operations and the like in the preparation of canned meats, baby foods, apple juice, etc. Thus, in accordance with the present invention, the enzyme preparation is stabilized by thoroughly drying the same at a temperature below about 45° C., to a pulverulent powder of constant weight. Further, the heat-stabilized enzyme preparation prior to incorporation in the aqueous food at the high temperatures encountered in packing is coated with methyl cellulose, whereby the hot aqueous food is effectively blocked from the enzyme at elevated temperatures. The methyl cellulose coating is preferably in the same dry condition as the dry enzyme preparation, and the methyl cellulose coating remains intact to protect the heat-stabilized enzyme in the hot aqueous food material.

Methyl cellulose prevents release of the inner stabilized core of the glucose oxidase-catalase enzyme preparation to the aqueous food preparation at elevated temperatures. Upon cooling, the water in the aqueous food permeates and tends to dissolve the methyl cellulose coating, whereby the inner core of glucose oxidase-catalase enzyme is released to the aqueous food in an active state to consume the limited quantities of free oxygen present in the food.

In the absence of the methyl cellulose coating, the dried enzyme does not display sufficient stability to withstand temperatures above 60° C. for any length of time without destroying substantial quantities of the enzymes and consequently losing a high percentage of the enzyme activity. It is surprising that the hydrophilic, rather water-soluble methyl cellulose coating should protect the heat-sensitive enzymes of the preparation at elevated temperatures, so that a substantial part of the enzyme activity is retained after the heat processing operation to provide assured removal of amounts of free oxygen which are present in the foodstuff in the finally packaged condition.

The advantage of adding the methyl cellulose-coated dry enzyme preparation directly to foodstuffs prior to their hot packing operation or during said operation in accordance with the present invention, as compared with the inability of the prior art enzyme compositions to be subjected to elevated temperatures after they have been incorporated in the foodstuff, is believed to be obvious. The incorporation of the enzyme preparation in accordance with the invention permits economy in processing operations since the preparation need only be added in the appropriate amount to the hot filled food just prior to capping without interfering with the filling operation or vacuum operations as are normally employed in commercial packing.

The addition of a predetermined quantity or dosage of enzyme can be made in the case of canned products such as tomatoes, corn, peas, and the like by the introduction of a pellet in which there may be incorporated the usual amount of salt of the proper weight as is employed in each can. In cases where such salt addition is not customary with the foodstuff, the introduction may be as a pellet without the salt.

Or, the stabilized enzyme preparation may be included in the surface coating of the can, can top, bottle or jar top or cap, said surface coating containing the thoroughly dry enzyme preparation encased in protective methyl cellulose. The binder in such coating may be methyl cellulose in which is incorporated the dry enzyme stabilized against heat. This coating is subjected to a preliminary drying operation in order to insure that the stabilization of the heat stabilized glucose oxidase-catalase preparation has not been impaired.

The dried coating can be further protected against entry by the cold aqueous food medium to insure that the coated surface containing methyl cellulose does not serve as a medium through which water enters to lower the capacity of the enzyme or to destroy the enzyme at high temperatures after the permeation by water at lower temperatures. An outer coating of a material insoluble in cold water, but which dissolves or melts in hot water and which is inert and non-deleterious to the aqueous food in the small amounts required, is provided in those cases where the surface coating is to be exposed for appreciable periods of time and may come into contact with water at room temperature. The material of the outer coating may be a heat-meltable food fatty acid such as stearic acid, phenyl salicylate (Salol), or other meltable or soluble food coating substance which is suitable as a heat-releasable food coating. In fact, this heat-releasable or heat-removable outer coating can, if desired, be gelatin, which in a sufficiently thick layer, about 0.02–0.05 inch, restricts the entrance of water at room temperature through the protective coating to the interior of the preparation of the enzymes.

The heat releasable coating is preferred where the container or container part itself is provided with a water protected methyl cellulose coating containing the enzyme preparation.

In certain instances, such as with tablets or coatings containing the heat-stabilized desiccated enzyme preparation of the present invention, it may be desirable to introduce therein the glucose substrate for the oxidase enzyme present in the tablet or coating. If glucose is already present in the food product to be protected from the harmful effects of free oxygen, then such addition of glucose in the enzyme preparation is not necessary. The glucose already present in the food is caused to oxidize with the ultimate production of harmless gluconic acid products.

Frequently, glucose is not present in the food product, but instead there is present some other sugar, such as maltose, sucrose, lactose, etc. In such case, glucose is introduced into the enzyme preparation in an amount which is sufficient to provide the substrate for the glucose oxidase and results in the elimination of the free oxygen by the oxidation of the glucose which has been added.

A further alternative is presented by incorporating in the tablet or coating wherein glucose is absent and such sugars as maltose, sucrose, lactose or the like are the sugars in the aqueous food, the additional corresponding enzyme, namely, maltase, invertase, or lactase, respectively, which corresponds to the particular sugar substrate and breaks down said substrate in the food to glucose. Thus, in the example of beer which contains no glucose, maltose is present. By addition of maltase to beer, the maltose is hydrolyzed into glucose which in turn will act as a suitable substrate for the glucose oxidase enzyme.

Similarly, if the condensed sugar is sucrose, the enzyme invertase converts the substrate into glucose. With lactose as the condensed carbohydrate in the food, lactase in the added enzyme preparation converts the lactose into glucose for the oxidase present. In the event that it is desired to convert starch as the condensed product into a glucose substrate for the oxidase present, the enzyme diastase in combination with maltase can be employed.

In certain kinds of oxidation reactions such as the oxidation of ascorbic acid or iso-ascorbic acid, the formation of hydrogen peroxide results in the same objectionable effects upon the taste and color of the aqueous food product as does the presence of free oxygen. The improved heat-stable enzyme compositions of the present invention are useful in the elimination of this hydrogen peroxide because of the presence of the enzyme catalase in the preparation. Catalase consumes hydrogen peroxide even though it is formed by an action other than that which may involve glucose oxidase.

In the foregoing modifications of the heat-stable enzyme preparations of the invention wherein glucose is incorporated in the enzyme composition, the oiling of the granulated or tableted desiccated enzyme preparation prior to the methyl cellulose coating operation is of particular advantage to prevent the takeup of water during the coating operation. In this oiling operation of the thoroughly dried enzyme preparation mineral oil is utilized as a thin coating over the enzyme powder. After the subsequent application of an aqueous coating of methyl cellulose about the oiled preparation, the drying of the protected composition is easier than in the case where the oiling is omitted.

The enzyme may be directly combined with methyl cellulose in aqueous form and thereafter dried to provide a heat stabilized preparation in accordance with the invention. Where packing conditions permit the rapid incorporation of the preparation into the hot packed aqueous food, the protective advantages against room temperature water provided by the heat-releasable coating are not necessary and satisfactory results are obtained with granule or pellet additions of this kind.

The pellets containing the heat-stabilized preparation of the present invention, may contain various binders such as gum acacia, gelatin, sucrose, glucose, starch, and the like.

To facilitate disintegration of the pellets or tablets, a disintegrator may be employed such as potato starch or corn starch in amounts of about 5 to 10% by weight based on the total weight of the composition. If the tablet is to be employed in an acid food product, sodium bicarbonate may be incorporated in the tablet to aid disintegration. In other instances, if desired, a stoichiometrically balanced blend of an alkali metal bicarbonate, such as sodium bicarbonate, together with an organic dry food acid may be employed as the disintegrator in dry form in amounts of about 3 to 8% by weight. The dry food acid, such as citric acid, reacts with the sodium bicarbonate upon coming in contact with free water in the food to cause the evolution of carbon dioxide and the disintegration of the tablet which liberates the enzyme into the aqueous food product.

The binders and disintegrators as well as other solids in the tablet or coating serve as diluents which are inert with respect to the enzyme activity. These solid diluents may include other materials such as filter aid, kaolin, salt and the like.

Glucose oxidase-catalase enzyme mixtures are commercially available. For example, the commercial preparation known as Fermcozyme which is obtained from the Fermco Chemicals, Inc., of Chicago, Illinois, is a solution having a glucose oxidase activity of about 750 units per cc. and a catalase activity of about 350 units per cc.

Catalase may be prepared separately, for example, by the process of Patent 2,635,069 and added to glucose oxidase, which may be prepared by the method of Coulthard et al., described in Biochemical Journal, vol. 39, page 24, 1945.

An active glucose oxidase enzyme having a high catalase activity may also be prepared from a species of penicillium as shown in Patent 2,482,724.

The amount of desiccated glucose oxidase-catalase enzyme employed depends upon the activity of the enzyme and the amount of free or molecular oxygen which is to be removed from the aqueous food product in its sealed or closed condition in the food container. This amount may be readily determined in view of the standardization of the activity of the glucose oxidase enzyme and the activity of the catalase enzyme.

One unit of glucose oxidase may be defined as that amount of enzyme which will cause the uptake of 10 cubic millimeters of oxygen per minute at 30° C. under assay conditions described by Scott, Journal of Agricultural and Food Chemistry, vol. 1: 727–30 (1953).

To assay a standard enzyme solution for catalase activity, 0.04 cc. of the enzyme preparation is added to a 250 cc. beaker. Then 100 cc. of 5 volume hydrogen peroxide (1.5%) buffered to pH 7.0 is added to the beaker and the mixture is allowed to stand for about one hour at about 25° C. A 4 cc. sample of the resulting solution is withdrawn and mixed with 5 cc. of 2 N $H_2SO_4$ and 2 grams of potassium iodide. The resulting solution is then titrated with 0.25 N thiosulfate solution. Likewise a 4 cc. sample of the 5 volume hydrogen peroxide solution (without enzyme addition) is mixed with 5 cc. of 2 N $H_2SO_4$ and 2 grams of potassium iodide and also titrated with the same 0.25 N thiosulfate solution. In each case the disappearance of an iodide color in the titrated solution serves as the end point. Subtract the difference between the two titrations from which may be calculated the equivalent of hydrogen peroxide decomposed by the enzyme in the first solution. A unit of catalase may be defined as that amount of enzyme which, under the above conditions, will decompose .0155 equivalent or 0.264 gram of hydrogen peroxide under assay conditions.

In terms of aqueous glucose oxidase enzyme preparations which are readily available in commerce, preparations can be obtained which vary in solid concentration from about 3 to about 100 milligrams or upwards of solids per cubic centimeter of enzyme solution. This may represent a glucose oxidase activity of from 10 to 1500 units per cubic centimeter of enzyme solution. On a dry solids weight basis, the activity of such solids may vary between 1,000 and 40,000 units of glucose oxidase activity per gram.

Since each unit on a dry solids basis causes the removal of 10 cubic centimeters of oxygen per minute at 30° C. under assay conditions, it is obvious that a dosage in excess of that required for the amount of free oxygen which is to be removed may readily be supplied to meet the specific requirements of the aqueous food product in the amount present in the standard size container in which said food is packaged.

For example, tablets or pellets containing the heat-stabilized glucose oxidase-catalase and methyl cellulose preparation of the present invention when employed for the removal of deleterious oxygen in 12 ounce containers of soft drinks, non-carbonated or carbonated, or of apple juice or of citrus fruit drinks in the same size container, provide effective stabilization permitting a shelf life extending to beyond 10 months and up to about a year with a glucose oxidase activity of about 15 to 25 units for the single pellet added to the container. Larger size containers of the food require only slightly larger pellet additions, for example, a 24 oz. container may be stabilized to the same extent with from 20–40 units of glucose oxidase enzyme.

In such glucose oxidase enzyme preparations about 2 to 4 units of catalase per 10 units of glucose oxidase is sufficient to catalyze the conversion of hydrogen peroxide produced enzymatically from the glucose substrate by the glucose oxidase. Larger amounts may be employed but tend to be wasteful of the enzyme and provide no additional benefit.

In the case where the stabilized glucose oxidase-catalase and methyl cellulose preparation is employed in the form of a coating on the interior surface of a container the strength of the enzymes is of the same order as in the employment of the preparation in the form of pellets. Based upon the weight of the coating employed in the interior of the container from about 15 to about 45 units of glucose oxidase and about 5 to about 15 units of catalase provide sufficient activity notwithstanding the temperatures to which they are subjected during can filling, to stabilize 12 ounce cans of aqueous food product. With canned meats and canned dog food which are susceptible to discoloration by free oxygen retained in the container, such coatings by bringing the active enzyme ingredients to all inner surfaces of the container are of particular value.

In instances where due to operational problems in filling the enzyme preparations of the invention are subjected to unusually high temperatures in the presence of aqueous food about 100° C. for appreciable periods of time, the destruction of the enzyme under these extremely severe conditions cannot be entirely prevented. However, the destruction is far less than with the commercial unstabilized preparations and in such cases the use of larger quantities of methyl cellulose, the oiling of the same and the use of an outer rather thick gelatin coating, all help to preserve the stabilized preparation under these severe conditions. At the same time it is helpful to use higher doses—about 50–100% and higher—in order to retain ample strength after exposure to such severe conditions. However, under normal packing conditions such excess is not needed.

Following are set forth a number of examples which illustrate the preparation of and various methods of employing the heat-stabilized desiccated enzyme preparations of the present invention for the protection of heat-processed aqueous foodstuffs from the deleterious action of free oxygen therein despite the exposure of the enzyme product in contact with the aqueous food product at elevated temperatures.

EXAMPLE 1

*Preparation of heat-stabilized glucose oxidase-catalase enzyme*

An aqueous solution of glucose oxidase-catalase enzyme preparation is mixed with 1.1 volumes acetone in the cold. The precipitate is filtered off and then air-dried to remove the solvent and provide a solid pulverulent or powdered product and thereafter dried in a vacuum desiccator over calcium chloride. By checking the weight loss until a constant value is noted, the complete dryness of the preparation is assured. Twenty-five grams of this powdered enzyme assayed about 4000 units as glucose oxidase per gram and about 2000 units of catalase per gram.

Drying of the air dry product at normal room humidities is insufficient in the above preparation to provide satisfactory stability in accordance with the heat stability requirements in the presence of aqueous food as dictated by the filling temperature conditions for use in accordance with the invention. Rapid inactivation of the air dried product at temperatures of 85–90° C. was noted in that deterioration to about one-half enzyme strength in about 10 minutes was observed, depending on the room humidity during drying. This inactivation is suppressed and substantially eliminated by the complete and thorough removal of water in a vacuum desiccator or as a full equivalent, drying in a forced draft laboratory area at about 30° C. until constant weight is achieved, this latter checked against the weight loss of the former procedure.

*Preparation of oiled pellets containing a methyl cellulose coating*

Twenty-five grams of the above thoroughly dried enzyme was pelleted in the form of compressed tablets. Compressed tablets were prepared from the powdered enzyme preparation by holding a piece of stainless steel with an 0.25 inch bore such that the opening on one end was closed by a flat plate, then into the other end was placed a measured amount of powder (250 mg.) and a rod of suitable diameter used to tamp down the powder, whereafter the compressed tablet was pushed out of the mold by the rod.

After cleaning away the rough edges the tablets averaged 170 mgs., in weight and assayed about 600 units glucose oxidase. These tablets were then lightly coated with mineral oil, and the excess mineral oil wiped off. The tablets were then dipped into a 5% solution of 15 cps. methyl cellulose (Methocel) and allowed to air dry overnight. They were then placed in an oven at 30° C. for more thorough drying to constant weight. After being dried they were placed in a rotating perforated drum and were sprayed with a solution of stearic acid in a volatile ligroin carrier. The resulting stearic coated tablets were dried.

The thickness of the stearic acid coating was approximately 6 mils. The stearic acid coated tablets averaged about 300 mgs.

It is important in the practice of this invention that the stearic acid or other outer heat-meltable or otherwise heat-releasable coating material be applied over the entire surface of the enzyme tablet. Porosity in this outer coating is objectionable.

One tablet was dropped in each of six test tubes containing 25 ml. of tomato juice having a pH of 4.4, the tomato juice having been preheated to the water bath temperature of 87° C. in which bath the tubes were immersed. At various times, as indicated in Table I, below, the tubes were removed to an ice water bath and the tube contents were quickly cooled to below about 25° C. During these operations, the tablets maintained their integrity. The tablets were broken up to release the enzyme into the tomato juice. The tomato juice containing the enzyme was assayed for both glucose oxidase and catalase. The results are given in Table I.

An aliquot of a commercial glucose oxidase-catalase system containing approximately 600 units of glucose oxidase and approximately 300 units of catalase was added to each of four test tubes containing tomato juice in an amount and treated, all as set forth above. The results are given in the table below marked "Control."

| Times in Minutes | Percent Activity Remaining | | | |
|---|---|---|---|---|
| | Control | | Table I | |
| | Glucose oxidase | Catalase | Glucose oxidase | Catalase |
| 0 | 100 | 100 | 100 | 100 |
| 3 | 0 | 43 | 94 | 94 |
| 6 | 0 | 15 | 91 | 90 |
| 9 | 0 | 0 | 84 | 87 |
| 12 | 0 | 0 | 81 | 82 |
| 15 | 0 | 0 | 78 | 73 |

EXAMPLE 2

Ten grams of sodium citrate and 10 grams of calcium carbonate were mixed with 35 ml. of a 5% solution of 15 cps. Methocel. The pH of the mixture was reduced from 7.8 to 6.2 by the addition of 1 ml. of 20% citric acid. Then 25 grams of powdered air dried enzyme preparation assaying about 4000 units glucose oxidase per gram and about 2000 units of catalase per gram was mixed in and the mixture extruded from a stainless steel tube with an 0.25 inch bore. The extrusion was cut into pieces of about one-quarter inch and dried in a vacuum desiccator, over calcium chloride to constant weight. Each pellet weighed about 0.2 gram.

The pellets were tested as in Example 1 and found to be effective.

The above mixture, instead of being extruded, is spread on a can lid in a thin layer.

EXAMPLE 3

The coating of methyl cellulose was made up in the same manner as in Example 2 except that the powdered enzyme was mixed with 2 parts of $NaH_2PO_4$ for each 10 parts by weight of enzyme preparation. The tablets were tested as in Example 1 and found to be effective.

EXAMPLE 4

Pellets are made by the procedure in Example 2, but the mineral oil coating is applied differently, namely by submerging the pellets in mineral oil and evacuating the vessel to withdraw the occluded air from the pellets. On release of the vacuum the pores in the pellet are filled with mineral oil. The pellets were tested as in Example 1 and found to be effective.

EXAMPLE 5

Equal volumes of 5% Methocel (15 cps.) and aqueous enzyme preparation were mixed and poured in a thin layer into a lightly oiled (to prevent sticking) cafeteria tray. It was air dried. It was cut into squares and the cut squares were dried to constant weight by the procedure (vacuum desiccator) of Example 1. The product was tested as in Example 1 and found to be effective.

In a variation of this example, 5% glycerol by weight was added to plasticize the film.

EXAMPLE 6

A film is prepared by the process of Example 5 and the film is cast on a can lid which is then coated with a molten phenyl salicylate preparation after drying by the procedure of Example 1.

EXAMPLE 7

The pulverulent enzyme preparation was dried in vacuo and then suspended in mineral oil, which was then enclosed in a Methocel capsule.

Other non-aqueous liquids may be used as the carrier for the enzyme preparation in lieu of the mineral oil.

Although the invention has been described with particular emphasis on the stabilization of a glucose oxidase-catalase enzyme preparation, it is not limited thereto since it is equally applicable to the stabilization of tyrosinase, phospatase, xanthine oxidase, alcohol dehydrogenase and other heat-sensitive enzymes.

I claim:

1. The method of stabilizing a glucose-oxidase-catalase enzyme preparation against destruction of enzyme activity by heat in the presence of moisture comprising drying said enzyme preparation to constant weight at temperatures below about 45° C., and coating said dry enzyme preparation with an insulating layer of cold water soluble methyl cellulose which is non permeable to aqueous media at temperatures above the deactivation temperature of said enzyme preparation.

2. The method as claimed in claim 1 wherein said enzyme preparation and methyl cellulose are first mixed and then dried to constant weight.

3. The method as claimed in claim 1 wherein said enzyme preparation is dried to constant weight at temperatures below about 45° C. before mixing with said methyl cellulose and thereafter drying said methyl cellulose enzyme mixture.

4. The method as claimed in claim 3 wherein said enzyme preparation is provided with a thin coating of mineral oil prior to coating with methyl cellulose.

5. The method as claimed in claim 1 wherein said preparation is formed into pellets.

6. The method as claimed in claim 1 wherein said preparation is provided with an outer coating which is insoluable in cold water and has a melting point above the gel point of methyl cellulose over said methyl cellulose coating.

7. The method as claimed in claim 6 wherein said heat-releasable coating is phenyl salicylate.

8. The method as claimed in claim 6 wherein said heat-releasable coating is stearic acid.

9. The method as claimed in claim 6 wherein said heat-releasable coating is gelatin.

10. A pre-dried heat-stabilized glucose oxidase-catalase enzyme preparation adapted to be added to heat-processed aqueous foods for removal of the free oxygen therein and capable of withstanding destruction by heat in the presence of moisture during filling, pasturizing and closing operation during which the food is packaged into containers, said preparation comprising solid active glucose oxidase and catalase enzymes dried to constant weight at temperatures below about 45° C. surrounded with a coating of cold water soluble methyl cellulose which is non-permeable to aqueous media at temperatures above the deactivation temperature of said enzyme preparation.

11. A pre-dried heat-stabilized glucose oxidase-catalase enzyme preparation adapted to be added to heat-processed aqueous foods for removal of free oxygen therein and capable of withstanding destruction by heat and moisture during filling, pasturizing and closing operations during which the food is packed into containers, said preparation comprising solid active glucose oxidase and catalase enzymes dried to constant weight at temperatures below about 45° C. and a cold water soluble methyl cellulose which is non-permeable to aqueous media at temperature above the deactivation temperature of said enzyme preparation, said enzymes being surrounded by said methyl cellulose in the form of a layer preventing access of hot water to the same.

12. The method of stabilizing a heat-sensitive enzyme preparation in which the enzyme is one normally inactivated by heat at temperatures higher than about 40° C., against destruction by heat in the presence of moisture comprising drying said enzyme preparation to constant weight at temperatures below about 45° C. and enclosing said enzyme preparation solids in cold water soluble methyl cellulose which is non-permeable to aqueous media at temperatures above the deactivation temperature of said enzyme preparation.

References Cited in the file of this patent

UNITED STATES PATENTS

| | | |
|---|---|---|
| 2,072,955 | Lunt | Mar. 9, 1937 |
| 2,482,724 | Baker | Sept. 20, 1949 |
| 2,642,376 | Gale et al. | June 16, 1953 |
| 2,689,203 | Lolli | Sept. 14, 1954 |
| 2,765,233 | Sarett et al. | Oct. 2, 1956 |